US 9,736,416 B2

(12) United States Patent
Yang et al.

(10) Patent No.: US 9,736,416 B2
(45) Date of Patent: Aug. 15, 2017

(54) KEY INFORMATION CONTROL SYSTEM AND CONTROL METHOD OF BODY KEYS OF DISPLAY, TELEVISION SET (71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventors: Jinglong Yang, Beijing (CN); Lu Li, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 14/915,383

(22) PCT Filed: Aug. 18, 2015

(86) PCT No.: PCT/CN2015/087373
§ 371 (c)(1),
(2) Date: Feb. 29, 2016

(87) PCT Pub. No.: WO2016/110102
PCT Pub. Date: Jul. 14, 2016

(65) Prior Publication Data
US 2016/0360143 A1 Dec. 8, 2016

(30) Foreign Application Priority Data
Jan. 6, 2015 (CN) .......................... 2015 1 0005298

(51) Int. Cl.
*H04N 5/50* (2006.01)
*H04N 5/445* (2011.01)
(Continued)

(52) U.S. Cl.
CPC ......... *H04N 5/44543* (2013.01); *G06F 3/023* (2013.01); *G06F 3/0219* (2013.01);
(Continued)

(58) Field of Classification Search
CPC ........... H04N 5/44513; H04N 5/44543; H04N 5/4403; H04N 21/485; H04N 21/4854;
(Continued)

(56) References Cited

U.S. PATENT DOCUMENTS 8,314,887 B2 * 11/2012 Wakisaka ............. H04N 21/485
348/563
8,587,724 B2 * 11/2013 Kang ............... H04N 21/42201
348/563

(Continued)

FOREIGN PATENT DOCUMENTS

CN  101533649 A  9/2009
CN  101977283 A  2/2011
(Continued)

OTHER PUBLICATIONS

International Search Report and Written Opinion both dated Nov. 20, 2015; PCT/CN2015/087373.
(Continued)

Primary Examiner — Sherrie Hsia
(74) Attorney, Agent, or Firm — Ladas & Parry LLP (57) ABSTRACT There are provided a key information control system and control method of body keys of a display and a television set, which relates to the display field and is capable of eliminating the problem of pressing a wrong key when the user operates the body keys. The key information control system comprises: the body keys disposed on the display; a detection means disposed in a surrounding area of the body keys, and configured to detect a state of a user relative to the body keys; a determination unit configured to determine whether
(Continued)

the user has intention to operate the body keys according to the state of the user relative to the body keys; and a key information display controlling unit configured to control key information of the body keys to be displayed at an edge of a display area of the display in the case that the user has intention to operate the body keys, to make a display position of the key information correspond to a position of the body keys.

15 Claims, 4 Drawing Sheets

(51) Int. Cl.
    *H04N 21/485* (2011.01)
    *G06F 3/02* (2006.01)
    *G06F 3/023* (2006.01)
    *G06F 3/03* (2006.01)
    *H04N 5/44* (2011.01)
    *H04N 5/64* (2006.01)

(52) U.S. Cl.
    CPC ......... *G06F 3/0304* (2013.01); *H04N 5/4403* (2013.01); *H04N 5/44513* (2013.01); *H04N 5/44591* (2013.01); *H04N 5/64* (2013.01); *H04N 21/485* (2013.01); *H04N 2005/44517* (2013.01)

(58) Field of Classification Search
    CPC ...... H04N 21/4312; H04N 5/50; H04N 5/445; G06F 3/0219; G06F 3/023; G06F 3/0304; G06F 3/0488; G06F 3/04883; G06F 3/044; G06F 3/0421; G06F 3/0412; G06F 3/042; G06F 3/045
    USPC ...... 348/569, 563, 564, 570; 725/37–40, 59; 345/173–175, 619, 629
    See application file for complete search history.

(56) References Cited

U.S. PATENT DOCUMENTS

| | | | |
|---|---|---|---|
| 2006/0244863 A1* | 11/2006 | Baikie | H04N 5/44513 348/569 |
| 2011/0310300 A1 | 12/2011 | Wakisaka | |
| 2012/0224102 A1 | 9/2012 | Kang et al. | |
| 2014/0359534 A1 | 12/2014 | Zhao | |

FOREIGN PATENT DOCUMENTS

| | | |
|---|---|---|
| CN | 201830373 U | 5/2011 |
| CN | 102104696 A | 6/2011 |
| CN | 102654824 A | 9/2012 |
| CN | 103701995 A | 4/2014 |
| CN | 103873913 A | 6/2014 |
| CN | 104216640 A | 12/2014 |
| CN | 104539863 A | 4/2015 |
| WO | 2014/014278 A1 | 1/2014 |

OTHER PUBLICATIONS

First Chinese Office Action dated Mar. 16, 2017; Appln. 201510005298.X.

* cited by examiner

KEY INFORMATION CONTROL SYSTEM AND CONTROL METHOD OF BODY KEYS OF DISPLAY, TELEVISION SET

TECHNICAL FIELD

The present disclosure relates to a technical field of display, in particular to a key information control system and control method of body keys of a display, and a television set.

BACKGROUND

Besides being controlled by a remote controller, a display such as a television set can also be controlled by keys disposed on a display body. For example, a user can adjust volume of a speaker of the television set by adjusting volume adjusting keys disposed at the side of television set body.

In order to maintain the display beautiful and give consideration to convenience of user operation, in the prior art, the body keys are always disposed on the display frame directly, and the body keys are noted on or nearby the body keys, for example, text note or sign note; or the body keys can be disposed on an operation control panel which is located on the display frame and can unscrew. This operation control panel is capable of automatically sensing and then unscrewing when a human body is close to the display. When the user presses down the body keys, the display would display an operation interface, and the user performs key operation as required with the aid of the operation interface.

However, in the application of the above prior art, inventors find at least following problems: both body keys disposed on the display frame directly or body keys disposed in the operation control panel have the problem that it is difficult for the user to recognize the body keys desired to operate due to too small and vague note or bad angle and so on. As a result, situations of pressing wrong keys always occur, which causes great trouble for the user to operate the body keys to control the display.

SUMMARY

Given the above problem, there is proposed a key information control system and control method of body keys of a display, and a television set, which are used to eliminate the problem of pressing a wrong key when the user operates the body keys.

According to a first aspect of the present disclosure, there is provided a key information control system of body keys of a display, comprising: the body keys disposed on the display; a detection means disposed in a surrounding area of the body keys, and configured to detect a state of a user relative to the body keys; a determination unit disposed inside the display and connected to the detection means, and configured to determine whether the user has intention to operate the body keys according to the state of the user relative to the body keys; and a key information display controlling unit connected to the determination unit, and configured to control key information of the body keys to be displayed at an edge of a display area of the display in the case that the user has intention to operate the body keys, to make a display position of the key information correspond to a position of the body keys.

Preferably, the detection means is an infrared sensor, whose sensing range covers an area where the body keys are located; the determination unit acquires infrared intensity radiated from the user and sensed by the infrared sensor, compares the acquired infrared intensity sensed by the infrared sensor with a preset infrared intensity, determines that the user has intention to operate the body keys when the acquired infrared intensity sensed by the infrared sensor is greater than or equal to the preset infrared intensity, and determines that the user has no intention to operate the body keys when the acquired infrared intensity sensed by the infrared sensor is smaller than the preset infrared intensity.

Preferably, when the acquired infrared intensity sensed by the infrared sensor within a preset period of time is always greater than or equal to the preset infrared intensity, the determination unit determines that the user has intention to operate the body keys; when at least part of the acquired infrared intensity sensed by the infrared sensor within the preset period of time is smaller than the preset infrared intensity, the determination unit determines that the user has no intention to operate the body keys.

Preferably, the detection means is distance sensors, which are disposed corresponding to the body keys one by one; the determination unit acquires a distances between the user and the body keys detected by the distance sensors, compares the acquired distances detected by the distance sensors with a preset distance, determines that the user has intention to operate the body keys when any one of the acquired distances detected by the distance sensors is smaller than or equal to the preset distance, and determines that the user has no intention to operate the body keys when each of the acquired distances detected by the distance sensors is greater than the preset distance.

Preferably, the determination unit determines that the user has intention to operate the body keys when any one of the acquired distances detected by the distance sensors within the preset period of time is always smaller than or equal to the preset distance, and determines that the user has no intention to operate the body keys when at least a part of each of the acquired distances detected by the distance sensors within the preset period of time is greater than the preset distance.

Preferably, the detection means is capacitive sensors, which are disposed corresponding to the body keys one by one; the determination unit acquires information about whether a user contacts the body keys detected by the capacitive sensors, determines that the user has intention to operate the body keys when the user contacts the body keys, and determines that the user has no intention to operate the body keys when the user does not contact the body keys.

Preferably, when the determination unit determines that the user has no intention to operate the body keys, the key information display controlling unit further controls the key information of the body keys to be not displayed on the display.

Preferably, when the user has intention to operate the body keys, the key information display controlling unit controls the key information of the body keys to be displayed in a form of an operation interface, wherein the operation interface comprises multiple levels of menus, each of which includes a plurality of function items, and the plurality of function items of each level of menu are not completely same as a plurality of function items of a parent level of menu or a child level of menu.

According to a second aspect of the present disclosure, there is provided a television set, comprising the key information control system of the body keys of the display described above.

According to a third aspect of the present disclosure, there is provided a key information control method of body keys of a display applicable to the key information control system of the body keys of the display, comprising: detecting a state of a user relative to the body keys of the control system (S1); determining whether the user has intention to operate the body keys according to the state of the user relative to the body keys (S2); and controlling key information of the body keys to be displayed at an edge of a display area of the display in the case that the user has intention to operate the body keys (S3), to make a display position of the key information correspond to a position of the body keys.

Preferably, the detection means of the key information control system is an infrared sensor, wherein the detecting a state of a user relative to the body keys of the control system (S1) comprises: sensing infrared intensity radiated from the user; wherein the determining whether the user has intention to operate the body keys according to the state of the user relative to the body keys (S2) comprises: acquiring the sensed infrared intensity, comparing the sensed infrared intensity acquired with a preset infrared intensity, determining that the user has intention to operate the body keys when the sensed infrared intensity acquired is greater than or equal to the preset infrared intensity, and determining that the user has no intention to operate the body keys when the sensed infrared intensity acquired is smaller than the preset infrared intensity.

Preferably, the sensed infrared intensity acquired being greater than or equal to the preset infrared intensity is: the sensed infrared intensity acquired within a preset period of time is always greater than or equal to the preset infrared intensity; the sensed infrared intensity acquired being smaller than the preset infrared intensity is: at least part of the sensed infrared intensity acquired within the preset period of time is smaller than the preset infrared intensity.

Preferably, the detection means of the key information control system is distance sensors, wherein said detecting a state of a user relative to the body keys of the control system (S1) comprises: detecting distances between the user and the body keys; wherein said determining whether the user has intention to operate the body keys according to the state of the user relative to the body keys (S2) comprises: acquiring the detected distances, comparing the detected distances acquired with a preset distance, determining that the user has intention to operate the body keys when any one of the detected distances acquired is smaller than or equal to the preset distance, and determining that the user has no intention to operate the body keys when each of the detected distances acquired is greater than the preset distance.

Preferably, said any one of the detected distances acquired being smaller than or equal to the preset distance is: any one of the detected distances acquired within the preset period of time is always smaller than or equal to the preset distance; said each of the detected distance acquired being greater than the preset distance is: at least a part of each of the detected distance acquired within the preset period of time is greater than the preset distance.

Preferably, the detection means of the control system is capacitive sensors, said detecting a state of a user relative to the body keys of the control system (S1) comprises: detecting whether the user contacts the body keys; said determining whether the user has intention to operate the body keys according to the state of the user relative to the body keys (S2) comprises: acquiring information detected about whether the user contacts the body keys, determining that the user has intention to operate the body keys when the user contacts the body keys, and determining that the user has no intention to operate the body keys when the user does not contact the body keys.

Preferably, the key information control method further comprises: controlling the key information of the body keys to be not displayed on the display in the case that the user has no intention to operate the body keys (S4).

Preferably, said controlling key information of the body keys to be displayed at an edge of a display area of the display (S3) comprises: controlling the key information of the body keys to be displayed in a form of an operation interface, wherein the operation interface comprises multiple levels of menus, each of which includes a plurality of function items, and the plurality of function items of each level of menu are not completely same as a plurality of function items of a parent level of menu or a child level of menu.

According to the key information control system and control method of the body keys of the display and the television set provided in the present disclosure, the detection means of the key information control system disposed in the surrounding area of the body keys is utilized to detect the state of the user relative to the body keys, and the determination unit is utilized to determine whether the user has intention to operate the body keys according to the detected state of the user relative to the body keys. If the user has intention to operate the body keys, then the key information display controlling unit is utilized to control the key information of the body keys to be displayed at the edge of the display area of the display, and make the display position of the key information correspond to the position of the body keys, such that the user is capable of operating the body keys through a prompt of the key information. Since the key information is displayed in the display in a form of an image, the key information is capable of being set larger and clearer, so that functions corresponding to respective body keys can be displayed clearly, thereby eliminating the problem that it is easy for the user to press wrongly due to too small and unclear notes of the keys.

BRIEF DESCRIPTION OF THE DRAWINGS

In order to describe technical solutions of embodiments of the present disclosure or the prior art more clearly, figures needed to be used in the description of the embodiments or the prior art will be introduced briefly below. Obviously, the figures described below are just some embodiments of the present disclosure, and other figures can be obtained by those ordinary skilled in the art according to these figures without paying any inventive work.

DETAILED DESCRIPTION

In order to make the above purposes, features and advantages of the present disclosure more obvious and easier to be understood, technical solutions in embodiments of the present disclosure will be described clearly and completely by combining with the figures in the embodiments of the present disclosure. Obviously, the embodiments described below are just a part of embodiments of the present disclosure, but not all of the embodiments. Based on the embodiments of the present disclosure, all of other embodiments obtained by those skilled in the art without paying any inventive work belong to the protection scope of the present disclosure.

First Embodiment

Figure 1A:
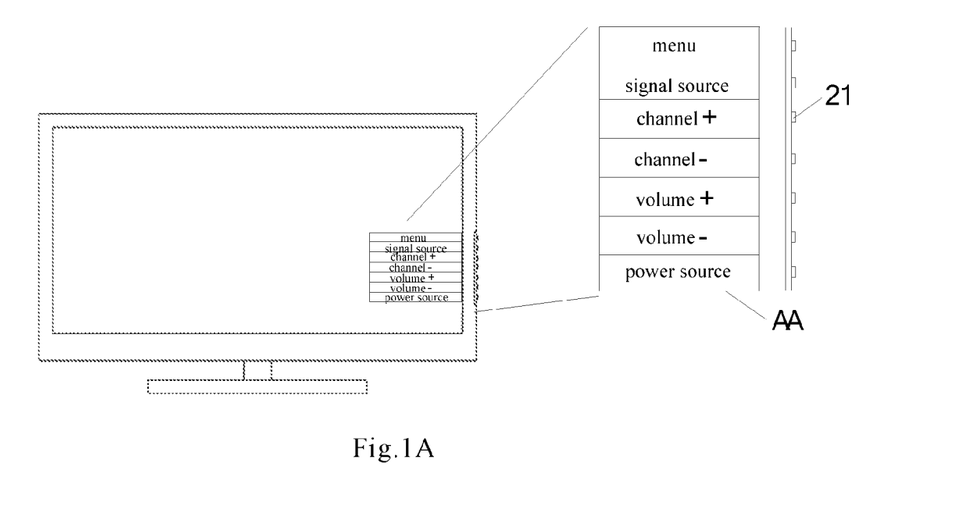
FIG. 1A is a schematic diagram when a key information control system of body keys of a display provided in a first embodiment of the present disclosure indicates key information.
Figure 1B:
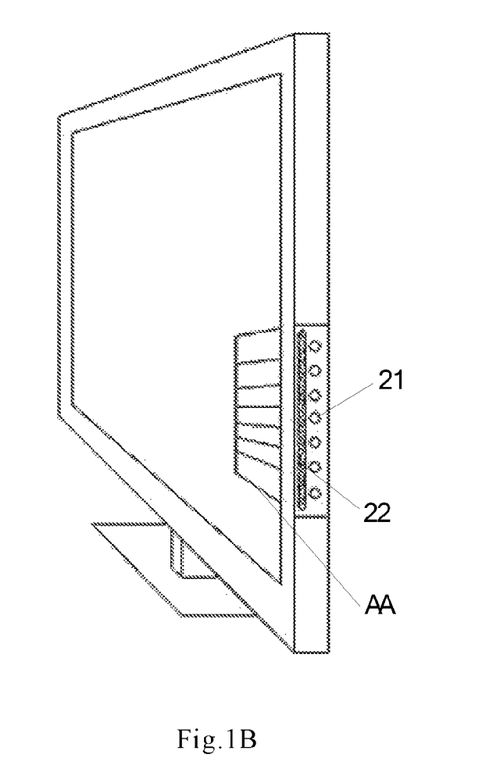
FIG. 1B is a side view of a display as shown in FIG. 1A.
Figure 2:
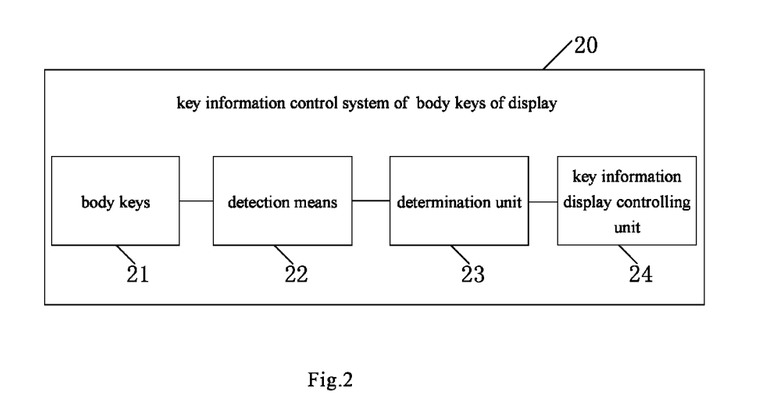
FIG. 2 is a schematic diagram of a structure of the key information control system of the body keys of the display provided in the first embodiment of the present disclosure.

The present embodiment is used to describe a key information control system of body keys of a display. As shown in FIGS. 1A, 1B and 2, the key information control system 20 of the body keys of the display provided in the present embodiment can comprise: body keys 21, a detection means 22, a determination unit 22 and a key information display controlling unit 24.

The body keys 21 are disposed on the display.

The detection means 22 is disposed in a surrounding area of the body keys 21, and configured to detect a state of a user relative to the body keys 21. For example, the detection means 22 senses infrared intensity radiated from the user, detects a distance between the user and the body keys 21, and detects whether the user contacts the body keys 21, and so on. It shall be known that the state of the user relative to the body keys that can be detected by the detection means 22 is not limited hereto, and may be different depending on specific implementation forms of the detection means 22. Any state that is capable of representing that the user has intention or has no intention to operate the body keys can be used for detection.

The determination unit 23 is disposed inside the display and connected to the detection means 22, and configured to determine whether the user has intention to operate the body keys 21 according to the state of the user relative to the body keys 21.

The key information display controlling unit 24 is connected to the determination unit 23, and configured to control key information AA of the body keys 21 to be displayed at an edge of a display area of the display in the case that the user has intention to operate the body keys 21, and make a display position of the key information AA correspond to a position of the body keys 21, so that the user is capable of operating the body keys 21 according to a prompt of the key information AA.

In the present embodiment, after the display is started up, the detection means 22 starts detecting the state of the user relative to the body keys 21 in real time, so as to acquire state information; the detection means 22 sends the state information to the determination unit 23; after receiving the state information, the determination unit 23 determines whether the user has intention to operate the body keys 21; if the user has intention to operate the body keys 21, then the key information display controlling unit 24 controls the key information AA to be displayed in a form as shown in FIGS. 1A and 1B, to provide clear key information AA for the user, which is used to assist the user in operating the body keys 21 correctly. Since the key information AA is displayed in the display in a form of an image, the key information AA is capable of being set larger and clearer, so that functions italicized preceding corresponding to respective body keys can be displayed clearly, thereby eliminating the problem that it is easy for the user to press wrongly due to too small and unclear notes of the keys.

In addition, the intelligent control method that interprets the user's operation intention according to the state of the user relative to the body keys 21 and displays the key information AA in an form of an image automatically is capable of realizing displaying the key information AA before the user operates the body keys, which gives convenience to the user's operation.

Compared with the solution in the prior art of disposing the body keys in the operation control panel that can unscrew in order to ensure the display beautiful and make the body keys identified easier, thereby causing an increase of manufacturing cost of the display frame, the key information control system provided in the present embodiment is capable of fully utilizing a display screen to assist in identifying and avoiding increasing of the manufacturing cost of the display frame.

In addition, the determination unit 23 and the key information display control displaying unit 24 in the key information control system provided in the present embodiment can be integrated on the original main board of the display, or disposed independently relative to the main board, and are capable of being applicable to displays of different models. Therefore, its excellent generality is capable of ensuring that a function of controlling the key information intelligently can be realized without making much alternation to the design and manufacturing of the existing display, and it can be implemented easily even through after-sale upgrading services.

The first embodiment of the present disclosure will be described more particularly below, and the purpose of the description below is not for limitation. Any specific implementation of determining the operation intention on the body keys by automatically sensing and displaying the key information in a form of an image shall fall into the protection scope of the present disclosure.

In order to determine whether the user has intention to operate the body keys 21, a first preset condition and/or a second preset condition can be set in the determination unit 23. The first preset condition is used to determine that the state information of the user relative to the body keys 21 conforms to the user's intention to operate the body keys, that is, the user has intention to operate the body keys; the second preset condition is used to determine that the state information of the user relative to the body keys 21 does not conform to the user's intention to operate the body keys, that is, the user has no intention to operate the body keys. Specific setting manner of the first preset condition and/or the second preset condition is related to types of the detection means 22 and the state of the user relative to the body keys 21 detected by the detection means 22, and it will be introduced in detail in the following text.

Firstly, the detection means 22 and state information detected by the detection means 22, and how to determine whether the user has intention to operate the body keys 21 according to the state information are described. The detection means 22 may be any one of an infrared sensor, a distance sensor, and a capacitive sensor.

Figure 3A:
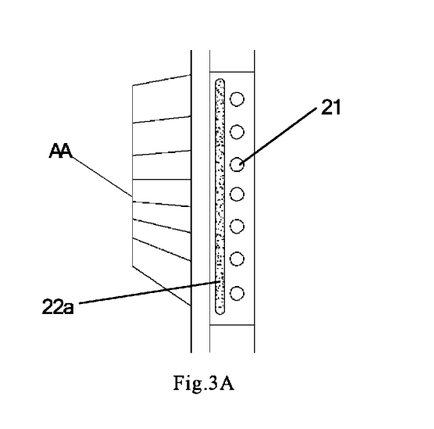
FIG. 3A is a diagram of a configuration that a detection means in the key information control system of the body keys of the display provided in the first embodiment of the present disclosure is an infrared sensor.

As shown in FIG. 3A, on the display, an infrared sensor 22*a* is disposed in the surrounding area of the body keys 21. The infrared sensor is a sensor being capable of sensing infrared rays. When a part of a human body is close enough to the key area of the display (comprising the body keys area and/or the infrared sensor disposed in the surrounding area of the body keys), even if the part of the human body does not contact the infrared sensor, infrared rays radiated from the human body can still be sensed by the infrared sensor disposed in the surrounding area of the body keys. The infrared sensor 22*a* can determine the sensed infrared intensity radiated from the user.

At the side of the display, the first preset condition can be that the sensed infrared intensity is greater than or equal to a preset infrared intensity, and the second preset condition can be that the sensed infrared intensity is smaller than the preset infrared intensity.

The determination unit 23 can acquire the infrared intensity sensed by the infrared sensor 22*a*, compares this infrared intensity with the preset infrared intensity, and determines that the user has intention to operate the body keys 21 when the infrared intensity sensed by the infrared sensor 22*a* is greater than or equal to the preset infrared intensity. Based on this, the key information display controlling unit 24 controls the key information AA of the body keys 21 to be displayed at the edge of the display area of the display, and makes the display position of the key information AA correspond to the position of the body keys 21, so that the user is capable of operating the body keys 21 according to the prompt of the key information AA. When the infrared intensity sensed by the infrared sensor 22*a* is smaller than the preset infrared intensity, the determination unit 23 determines that the user has no intention to operate the body keys 21. At this time, the control unit 23 can control the key information AA to be not displayed on the display.

The preset infrared intensity can be set as required according to specific conditions of sensitivity of the infrared sensor 22*a* and indoor environment and so on. For example, if the sensitivity of the infrared sensor 22*a* is relatively low, then its response to the outside infrared intensity would be relatively insensitive, and at this time, the preset infrared intensity can be set smaller, to eliminate adverse impact of low sensitivity; on the contrary, if the sensitivity of the infrared sensor 22*a* is relatively high, then the preset infrared intensity can be set higher, to avoid error determination caused by situations of having no intention to operate hut just passing by the display and so on. For another example, if the in-door environment has great influence on the sensed infrared intensity (for example, the infrared intensity of the in-door environment per se is relatively high), then the preset infrared intensity would be set relatively high, to avoid error determination caused by the situation of heat source of non-users being closing to the display and so on; on the contrary, if the in-door environment has little influence on the sensed infrared intensity, then there is no need to set the preset infrared intensity relatively high, and the preset infrared intensity would be set according to the infrared intensity that can be sensed by the infrared sensor 22*a* when the user is within an operable distance of the display.

Further, in order to reduce error control phenomenon, the first preset condition can be set more particularly as that the infrared intensity sensed by the infrared sensor 22*a* within the preset period of time is always greater than or equal to the preset infrared intensity, and the second preset condition can be set more particularly as that at least part of the infrared intensity sensed by the infrared sensor 22*a* within the preset period of time is smaller than the preset infrared intensity.

The preset period of time can be set according to an average shortest time required by the user to operate the body keys 21, for example, being set as 50%-100% of the average shortest time. For example, if the average shortest time required by the user to operate the body keys 21 is 2 seconds, then the preset period of time can be set as 1 to 2 seconds.

The infrared sensor 22*a* senses the infrared intensity radiated from the user for many times within the preset period of time. In this way, by setting the preset period of time, it is capable of reducing the situation that the determination unit 23 misdetermines the user's intention as the user being about to operate the body keys 21 when the user is close to the key area unintentionally. It should be explained that, when the user operates the display according to the operation interface displayed on the display, the infrared sensor 22*a* can detect the human body continuously, and when the part of the human body leaves away from the key area of display area, the operation interface would disappear automatically.

Figure 3B:
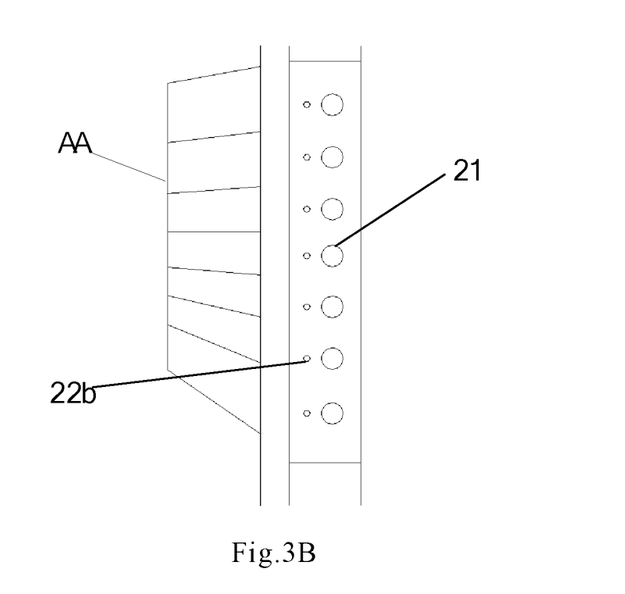
FIG. 3B is a diagram of a configuration that a detection means in the key information control system of the body keys of the display provided in the first embodiment of the present disclosure is a distance sensor.

As shown in FIG. 3B, on the display, distance sensors 22*b* are disposed in the surrounding area of the body keys 21, and are disposed corresponding to the body keys 21 one by one. The distance sensors 22*b* can transmit light pulses with a very short wavelength (for example, 905 nm, 1540 nm, or 1064 nm, etc.), measure time intervals of the light pulses from being transmitted to being reflected by an object, and calculate a distance between the distance sensors 22*b* and the object according to the measured time intervals.

At the side of the display, the first preset condition can be set as that any of the distances between the user and the body keys 21 (the distance sensors 22*b* are disposed nearby the body keys 21) is smaller than or equal to a preset distance, and the second preset condition can be set as that each of the distances between the user and the body keys 21 (the distance sensors 22*b* are disposed nearby the body keys 21) is greater than the preset distance.

The determination unit 23 can acquire the distances between the distance sensors 22*b* and the object that are calculated by the distance sensors 22*b*, compare the distances between the distance sensors 22*b* and the object with the preset distance, and determine that the user has intention to operate the body keys 21 when any one of the distances between the distance sensors 22*b* and the object is smaller than or equal to the preset distance. On such a basis, the key information display controlling unit 22 controls the key information AA of the body keys 21 to be displayed at the edge of the display area of the display, and makes the display position of the key AA correspond to the position of the body keys 21, so that the user is capable of operate the body keys 21 according to the prompt information of the key information AA. When each of the distances between the distance sensors 22*b* and the object is greater than the preset distance, the determination unit 23 determines that the user has no intention to operate the body keys 21. At this time, the control unit 23 can control the key information AA to be not displayed on the display. The preset distance can be set as required according to specific situations such as sensitivity of the distance sensor 22*b* and in-door environment or the like.

Further, in order to reduce error control phenomenon, the first preset condition can be set more particularly as that any one of the distances between the distance sensors 22*b* and the object within the preset period of time is always smaller than or equal to the preset distance, and the second preset condition can be set more particularly as that at least part of each of the distances between the distance sensors 22b and the object within the preset period of time is greater than the preset distance. By setting this preset period of time, it would make an effect similar to the effect made by setting the preset period of time when the detection means 22 is the infrared sensor 22a.

Compared with the infrared sensor 22a, the area that can be sensed by a distance sensor 22b is relatively small. Therefore, it is disposed that each body key 21 is corresponding to a single distance sensor 22b. In order to further assist the user in determining the body key 21 to be operated, when the state information satisfies the first preset condition, the determination unit 23 can determine the body key 21 closest to the user according to the distance information. As such, the key information display controlling unit 24 can control and instruct the body key 21 closest to the user more particularly when controlling the key information AA to be displayed. For example, when fingers of the user are close to a body key 21 and nearby its distance sensor 22b, the distance sensor 22b is capable of detecting that the body key 21 is in a state of being selected by the user. In a popped up operation interface, the function corresponding to the key 21 is displayed in a highlighted state to assist the user in selecting.

Figure 3C:
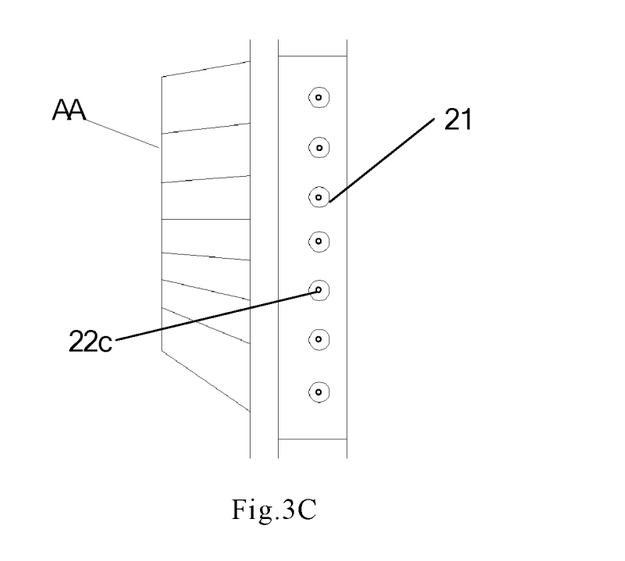
FIG. 3C is a diagram of a configuration that a detection means in the key information control system of the body keys of the display provided in the first embodiment of the present disclosure is a capacitive sensor.

As shown in FIG. 3C, on the display, capacitive sensors 22c can be disposed in the surrounding area of the body keys 21 (a capacitive sensor 22c is disposed on a body key 21). A capacitive sensor can determine whether the user touches the key through generating a coupling effect between its internal electrode and the human body, i.e., determining whether the user touches the key through a current leaked from the capacitive sensor to the human body.

At the side of the display, the first preset condition can be: the state information is that the user touches the body keys 21; the second preset condition can be: the state information is that the user does not touch the body keys 21.

The determination unit 23 can acquire the status information of the user relative to the body keys 21, and determine that the user has intention to operate the body keys 21 when the state information is that the user touches the body keys 21. On such a basis, the key information display controlling unit 24 controls the key information of the body keys 21 to be displayed at the edge of the display area of the display, and makes the display position of the key information correspond to the position of the body keys 21, so that the user is capable of operating the body keys 21 according to the prompt of the key information. When the state information is that the user does not touch the body keys 21, the determination unit 23 determines that the user has no intention to operate the body keys 21. At this time, the key information display controlling unit 24 can control the key information to be not displayed on the display.

Compared with the infrared sensor 22a and the distance sensor 22b, the area that can be sensed by the capacitive sensor 22c is smaller. For this reason, a capacitive sensor 22c is set preferably on the surface of a body key 21 used for pressing. In order to further assist the user in determining the body key 21 to be operated, when the state information satisfies the first preset condition, the determination unit 23 can further be configured to determine the body key 21 touched by the user according to the state information. As such, the key information display controlling unit 24 can control and instruct the body key 21 touched by the user when controlling the key information to be displayed. For example, when fingers of the user touch a body key 21, a capacitive sensor 22c is capable of detecting that the body key 21 is in a state of being selected by the user. In the popped up operation interface, the function corresponding to the body key 21 is displayed in a highlighted state to assist the user in selecting.

Then, displaying of the key information controlled by the key information display controlling unit 24 is described. As shown in FIG. 1B, the key information AA can be represented as the operation interface particularly, the operation interface can comprise multiple levels of menus, each of which can include a plurality of function items, and the plurality of function items of each level of menu are not completely the same as the plurality of function items of a parent level/child level of menu. For example, function items of "menu", "signal source", "directory+", "directory−", "increase", "reduce", "power supply" and so on corresponding to a plurality of body keys 21 one by one can be set in a first level of menu. A second level of menu can be entered by pressing down the key "menu". The second level of menu corresponding to the function item "menu" of the first level can include function items such as "image" "sound", "scaling", "channel", "other", "back" and "power supply".

The key information display controlling unit 24 can be particularly configured to: control the key information to be displayed in a form of an operation interface when the detection information of the detection means 22 satisfies the first preset condition, that is, when the user has intention to operate the body keys 21. When the key information display controlling unit 24 receives the user's selection of a function item of a level of menu, in the case that this function item is corresponding to a child level of menu, a plurality of function items of the child level of menu corresponding to this function item are displayed.

In particular, the key information display controlling unit 24 can give a shortcut key function to each body key, such that each key does not correspond to a single function, but corresponds to different functions under different levels of menus. In addition, for a certain menu comprising a plurality of function items, in the child level of menu corresponding to each function item, each key can be corresponding to a different function. For example, as shown in Table 1, bold letters mark the sequence of function items selected in this example, and other function items are similar, wherein each level of menu does not only include such function items as "menu", "signal source", "directory+", "directory−", "increase", "reduce", "power supply". In this way, every time a user selects one function item to enter into the child level of menu, he can select the function item in this sub-menu directly through the key, so as to realize a quick selection of the function items and avoid complicated switching.

TABLE 1

|  | First level | Second level | Third level | Fourth level | Fifth level | Sixth level |
|---|---|---|---|---|---|---|
| Key | Root directory | →menu | →image | →image mode | →user | →luminance |
| Key 1 | Menu | Image | Image | standard | luminance | OK |
| Key 2 | Signal source | sound | Color temperature | soft | Contrast | Luminance++ |
| Key 3 | Channel+ | Scaling | Energy saving | Motion | Saturation | Luminance+ |

TABLE 1-continued

| | First level | Second level | Third level | Fourth level | Fifth level | Sixth level |
|---|---|---|---|---|---|---|
| Key 4 | Channel+ | Channel | Noise reduction | Nature | Back-light | Luminance− |
| Key 5 | Volume+ | Others | | User | | Luminance−− |
| Key 6 | Volume− | Back | Back | Back | Back | Back |
| Key 7 | Power supply | Power Hupply | Power supply | Power supply | Power supply | Power supply |

Second Embodiment

Corresponding to the first embodiment, there is provided in the present embodiment a television set, comprising the key information control system 20 of the body keys of the display as described in the first embodiment. In the present embodiment, the display is equivalent to a display screen of the television set. Body keys 21 are disposed in a frame area of the television set, and a detection means 22 is disposed in a surrounding area of the body keys 21.

A determination unit 23 and a key information display controlling unit 24 comprised in the key information control system 20 can be disposed inside the television set, for example, being disposed on a main board of the television set.

The determination unit 23 is connected to the detection means 22, and configured to determine whether the user has intention to operate the body keys 21 according to a state of a user relative to the body keys 21; the key information display controlling unit 24 is connected to the determination unit 23, and configured to control key information of the body keys 21 to be displayed at the edge of the display area of the display in the case that the user has intention to operate the body keys 21, and make the display position of the key information correspond to the position of the body keys 21, so that the user is capable of operating the body keys 21 through a prompt of the key information. Since the key information is displayed in the display in a form of an image, the key information is capable of being set larger and clearer, so that functions corresponding to respective body keys can be displayed clearly, thereby eliminating the problem that it is easy for the user to press wrongly due to too small and unclear notes of the key.

In the present embodiment, the key information control system 20 comprised in the television set further has other functions as described in the first embodiment, and thus no further description is given herein.

Third Embodiment

Corresponding to the first embodiment, there is provided in the present embodiment a key information control method of body keys of a display applicable to the key information control system of the body keys of the display provided in the first embodiment. In the key information control system, body keys are disposed in a frame area of a display, and a detection means is disposed in a surrounding area of the body keys.

Figure 4:
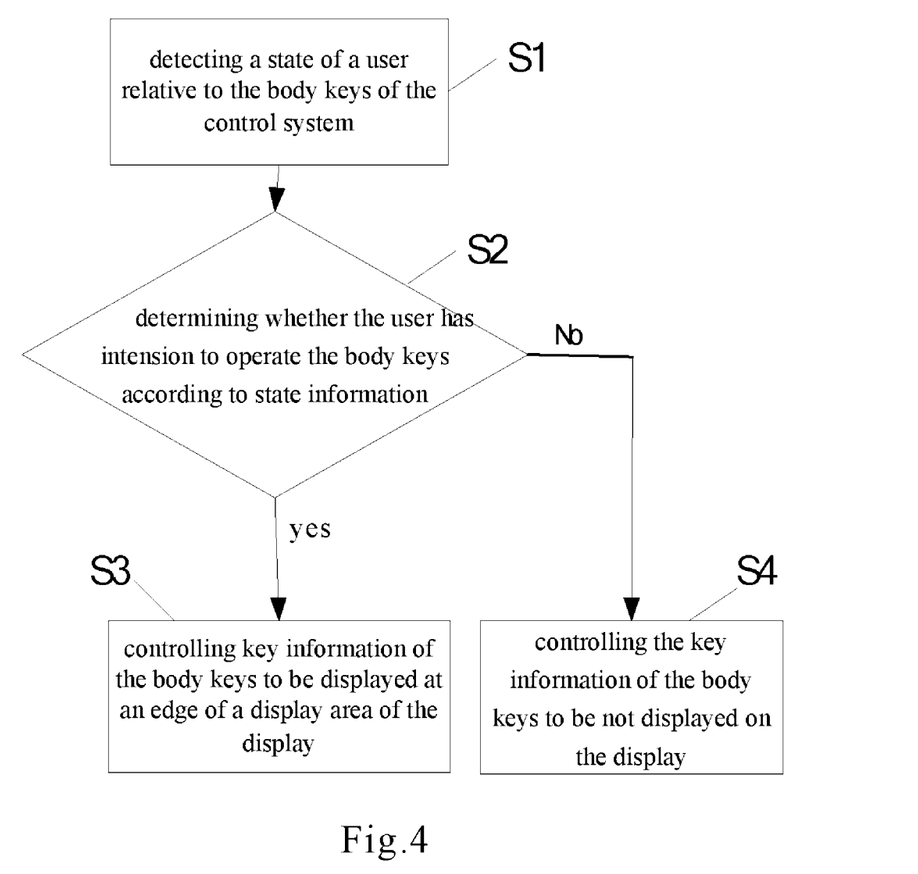
FIG. 4 is a flowchart of a key information control method of body keys of a display provided in a third embodiment of the present disclosure.

FIG. 4 is a flowchart of a key information control method of body keys of a display provided in the third embodiment of the present disclosure.

At Step S1: a state of a user relative to the body keys is detected.

At Step S2: it is determined whether the user has intention to operate the body keys according to the state of the user relative to the body keys. In the case that the user has intention to operate the body keys, it moves to step S3. Otherwise, it moves to step S4.

At Step S3: it is controlled to display key information of the body keys at an edge of a display area of the display, and make a display position of the key information correspond to a position of the body keys, so that the user is capable of operating the body keys according to the prompt of the key information.

In the present embodiment, after the display is started up, the state of the user relative to the body keys starts to be detected in real time, so as to acquire state information; then, it is determined whether the user has intention to operate the body keys according to the state of the user relative to the body keys; if the user has intention to operate the body keys 21, then the key information of the body keys is controlled to be displayed at the edge of the display area of the display, to make the display position of the key information correspond to the position of the body keys, so that the user is capable of operating the body keys according to a prompt of the key information. Since the key information is displayed in the display in a form of an image, the key information is capable of being set larger and clearer, so that functions corresponding to respective body keys can be displayed clearly, thereby eliminating the problem that it is easy for the user to press wrongly due to too small and unclear notes of the keys.

According to the key information control method provided in the present embodiment, it can further control the key information of the body keys to be not displayed on the display in step S4. Correspondingly, when it is determined in step S2 that the user has no intention to operate the body keys, it moves to step S4. Thus, the key information control method provided in the present embodiment is further improved.

In the present embodiment, in order to determine whether the user has intention to operate the body keys, a first preset condition and a second preset condition can be set. The first preset condition is used to represent that the state information of the user relative to the body keys conforms to the user's intention to operate the body keys, that is, the user has intention to operate the body keys; the second preset condition is used to represent that the state information of the user relative to the body keys does not conform to the user's intention to operate the body keys, that is, the user has no intention to operate the body keys.

An infrared sensor can be taken as the detection means. The infrared sensor is used to sense infrared intensity radiated from the user. The display can acquire infrared intensity sensed by the infrared sensor, compare the infrared intensity sensed by the infrared sensor with a preset infrared intensity, determine that the user has intention to operate the body keys when the infrared intensity sensed by the infrared sensor is greater than or equal to the preset infrared intensity (satisfying the first preset condition), and determine that the user has no intention to operate the body keys when the infrared intensity sensed by the infrared sensor is smaller than the preset infrared intensity (satisfying the second preset condition).

When the detection means is the infrared sensor, in order to further reduce error control phenomenon, the first preset condition can be set more particularly as that the infrared intensity sensed by the infrared sensor within the preset period of time is always greater than or equal to the preset infrared intensity, and the second preset condition can be set more particularly as that at least part of the infrared intensity sensed by the infrared sensor within the preset period of time is smaller than the preset infrared intensity.

Distance sensors can be taken as the detection means. The distance sensors are used to detect distances between the user and the body keys. The display can acquire the distances between the user and the body keys detected by the distance sensors, compare the distances detected by the distance sensors with a preset distance, determine that the user has intention to operate the body keys when any one of the distances detected by the distance sensors is smaller than or equal to the preset distance (satisfying the first preset condition), and determines that the user has no intention to operate the body keys when each of the acquired distances detected by the distance sensors is greater than the preset distance (satisfying the second preset condition).

When the detection means is the distance sensors, in order to further reduce error control phenomenon, the first preset condition can be set more particularly as that any one of the distances detected by the distance sensors within the preset period of time is always smaller than or equal to the preset distance, and the second preset condition can be set more particularly as that at least part of each of the acquired distances detected by the distance sensors within the preset period of time is greater than the preset distance.

Compared with the infrared sensor, the area that can be sensed by the distance sensor is relatively small. When each body key is corresponding to a single distance sensor, in order to further assist the user in determining the body key be operated, in the case that the state information satisfies the first preset condition, that is, the user has intention to operate the body keys, the display can further determine the body key closest to the user according to the state information. After the body key closest to the user is determined, the body key closest to the user is controlled and instructed. For example, when fingers of the user are close to a body key and nearby its distance sensor, the distance sensor is capable of detecting that the body key is in a state of being selected by the user. In a popped up operation interface, the function corresponding to the body key is displayed in a highlighted state to assist the user in selecting.

Capacitive sensors can be taken as the detection means. The capacitive sensor is used to detect whether the user contacts the body keys. It is determined the user has intention to operate the body keys when the user contacts the body keys (satisfying the first preset condition); it is determined the user has no intention to operate the body keys when the user does not contact the body keys (satisfying the second preset condition).

Compared with the infrared sensor and the distance sensor, the area that can be sensed by the capacitive sensor is smaller. For this reason, a capacitive sensor is set preferably on the surface of a body key used for pressing. In order to further assist the user in determining the body key to be operated, when the state information satisfies the first preset condition, that is, the user has intention to operate the body keys, the display can determine the body key contacted by the user according to the state information. After the body key contacted by the user is determined, the body key contacted by the user is controlled and instructed. For example, when fingers of the user touch a body key, the capacitive sensor is capable of detecting that the body key is in a state of being selected by the user. In the popped up operation interface, the function corresponding to the body key is displayed in a highlighted state to assist the user in selecting.

It should be explained that the provided key information control method is described briefly in the present embodiment by only taking the detection means being the infrared sensor, the distance sensors, and the capacitive sensors as an example, please refer to the first embodiment for the specific description.

The key information in the present embodiment can be in particular an operation interface. The operation interface can comprise multiple levels of menus, each of which includes a plurality of function items, please refer to the description in the first embodiment for details. In the present embodiment, in step S3, the key information of the body keys is controlled to be displayed in a form of the operation interface, wherein the operation interface comprises multiple levels of menus, each of which includes a plurality of function items, and the plurality of function items of each level of menu are not completely same as a plurality of function items of a parent level of menu or a child level of menu. When the user's selection of a function item of a level of menu is received, in the case that this function item is corresponding to a child level of menu, a plurality of function items of the child level of menu corresponding to this function item are displayed.

Respective embodiments in the specification are described progressively, same or similar parts of the respective embodiments can refer to each other, and each embodiment mainly describes the differences than other embodiments. In particular, for a system embodiment, since it is basically similar to a method embodiment, it is described simpler, and thus its relevant points would refer to a part description of the method embodiment.

The above descriptions are just specific implementations of the present disclosure, but the protection scope of the present disclosure is not limited thereto. Any alternation or replacement that can be easily conceived by those skilled in the art who are familiar with the present technical field within the technical range disclosed in the present disclosure shall be covered within the protection scope of the present disclosure. Therefore, the protection scope of the present disclosure shall be subjected to the protection scope of the claims.

The present application claims the priority of a Chinese patent application No. 201510005298.X filed on Jan. 6, 2015, with an invention title of "KEY INFORMATION CONTROL SYSTEM ABD CONTROL METHOD OF BODY KEYS OF DISPLAY, TELEVISION SET". Herein, the content disclosed by the Chinese patent application is incorporated in full by reference as a part of the present disclosure.

What is claimed is:

1. A key information control system of body keys of a display, characterized in that, comprising:
   the body keys disposed on the display;
   a detection means disposed in a surrounding area of the body keys, and configured to detect a state of a user relative to the body keys;
   a determination unit disposed inside the display and connected to the detection means, and configured to determine whether the user has intention to operate the body keys according to the state of the user relative to the body keys; and
   a key information display controlling unit connected to the determination unit, and configured to control key information of the body keys to be displayed at an edge of a display area of the display and in a form of an operation interface in the case that the user has intention to operate the body keys, to make a display position of the key information correspond to a position of the body keys, wherein the operation interface comprises multiple levels of menus, each of which includes a plurality of function items, and the plurality of function items of each level of menu are not completely same as a plurality of function items of a parent level of menu or a child level of menu.

2. The key information control system of the body keys of the display according to claim 1, characterized in that, the detection means is an infrared sensor, whose sensing range covers an area where the body keys are located;
the determination unit acquires infrared intensity sensed by the infrared sensor and radiated from the user, compares the acquired infrared intensity sensed by the infrared sensor with a preset infrared intensity, determines that the user has intention to operate the body keys when the acquired infrared intensity sensed by the infrared sensor is greater than or equal to the preset infrared intensity, and determines that the user has no intention to operate the body keys when the acquired infrared intensity sensed by the infrared sensor is smaller than the preset infrared intensity.

3. The key information control system of the body keys of the display according to claim 2, characterized in that, when the acquired infrared intensity sensed by the infrared sensor within a preset period of time is always greater than or equal to the preset infrared intensity, the determination unit determines that the user has intention to operate the body keys;
when at least part of the acquired infrared intensity sensed by the infrared sensor within the preset period of time is smaller than the preset infrared intensity, the determination unit determines that the user has no intention to operate the body keys.

4. The key information control system of the body keys of the display according to claim 1, characterized in that, the detection means is distance sensors, which are disposed corresponding to the body keys one by one;
the determination unit acquires distances between the user and the body keys detected by the distance sensors, compares the acquired distances detected by the distance sensors with a preset distance, determines that the user has intention to operate the body keys when any one of the acquired distances detected by the distance sensors is smaller than or equal to the preset distance, and determines that the user has no intention to operate the body keys when each of the acquired distances detected by the distance sensors is greater than the preset distance.

5. The key information control system of the body keys of the display according to claim 4, characterized in that, when any one of the acquired distances detected by the distance sensors within the preset period of time is always smaller than or equal to the preset distance, the determination unit determines that the user has intention to operate the body keys; when at least a part of each of the acquired distances detected by the distance sensors within the preset period of time is greater than the preset distance, the determination unit determines that the user has no intention to operate the body keys.

6. The key information control system of the body keys of the display according to claim 1, characterized in that, the detection means is capacitive sensors, which are disposed corresponding to the body keys one by one;
the determination unit acquires information about whether a user contacts the body keys detected by the capacitive sensors, determines that the user has intention to operate the body keys when the user contacts the body keys, and determines that the user has no intention to operate the body keys when the user does not contact the body keys.

7. The key information control system of the body keys of the display according to claim 1, characterized in that, when the determination unit determines that the user has no intention to operate the body keys, the key information display controlling unit further controls the key information of the body keys to be not displayed on the display.

8. A television set, characterized in that, comprising the key information control system of the body keys of the display according to claim 1.

9. A key information control method of body keys of a display, characterized in that, being applicable to the key information control system of the body keys of the display according to claim 1, comprising:
detecting a state of a user relative to the body keys of the control system (S1);
determining whether the user has intention to operate the body keys according to the state of the user relative to the body keys (S2); and
controlling key information of the body keys to be displayed at an edge of a display area of the display and in a form of an operation interface in the case that the user has intention to operate the body keys (S3), to make a display position of the key information correspond to a position of the body keys, wherein the operation interface comprise multiple levels of menus, each of which includes a plurality of function items, and the plurality of function items of each level of menu are not completely same as a plurality of function items of a parent level of menu or a child level of menu.

10. The key information control method of the body keys of the display according to claim 9, characterized in that, the detection means of the key information control system is an infrared sensor;
wherein said detecting a state of a user relative to the body keys of the control system (S1) comprises: sensing infrared intensity radiated from the user;
wherein said determining whether the user has intention to operate the body keys according to the state of the user relative to the body keys (S2) comprises: acquiring the sensed infrared intensity, comparing the sensed infrared intensity acquired with a preset infrared intensity, determining that the user has intention to operate the body keys when the sensed infrared intensity acquired is greater than or equal to the preset infrared intensity, and determining that the user has no intention to operate the body keys when the sensed infrared intensity acquired is smaller than the preset infrared intensity.

11. The key information control method of the body keys of the display according to claim 10, characterized in that,
the sensed infrared intensity acquired being greater than or equal to the preset infrared intensity is: the sensed infrared intensity acquired within a preset period of time is always greater than or equal to the preset infrared intensity;
the sensed infrared intensity acquired being smaller than the preset infrared intensity is: at least part of the sensed infrared intensity acquired within the preset period of time is smaller than the preset infrared intensity.

12. The key information control method of the body keys of display according to claim 9, characterized in that, the detection means of the key information control system is distance sensors;

wherein said detecting a state of a user relative to the body keys of the control system (S1) comprises: detecting distances between the user and the body keys;

wherein said determining whether the user has intention to operate the body keys according to the state of the user relative to the body keys (S2) comprises: acquiring detected distances, comparing the detected distances acquired with a preset distance, determining that the user has intention to operate the body keys when any one of the detected distances acquired is smaller than or equal to the preset distance, and determining that the user has no intention to operate the body keys when each of the detected distances acquired is greater than the preset distance.

13. The key information control method of the body keys of the display according to claim 12, characterized in that, said any one of the detected distances acquired being smaller than or equal to the preset distance is: any one of the detected distances acquired within the preset period of time is always smaller than or equal to the preset distance; said each of the detected distances acquired being greater than the preset infrared intensity is: at least a part of each of the detected distances acquired within the preset period of time is greater than the preset distance.

14. The key information control method of the body keys of the display according to claim 9, characterized in that, the detection means of the control system is capacitive sensors;

said detecting a state of a user relative to the body keys of the control system (S1) comprises: detecting whether the user contacts the body keys;

said determining whether the user has intention to operate the body keys according to the state of the user relative to the body keys (S2) comprises: acquiring detected information about whether the user contacts the body keys, determining that the user has intention to operate the body keys when the user contacts the body keys, and determining that the user has no intention to operate the body keys when the user does not contact the body keys.

15. The key information control method of the body keys of the display according to claim 9, characterized in that, the key information control method further comprises:

controlling the key information of the body keys to be not displayed on the display in the case that the user has no intention to operate the body keys (S4).

* * * * *